Oct. 21, 1947.     F. G. CONNOR ET AL     2,429,201
WORK FEEDING AND ROTATING APPARATUS
Filed May 18, 1945     5 Sheets-Sheet 5
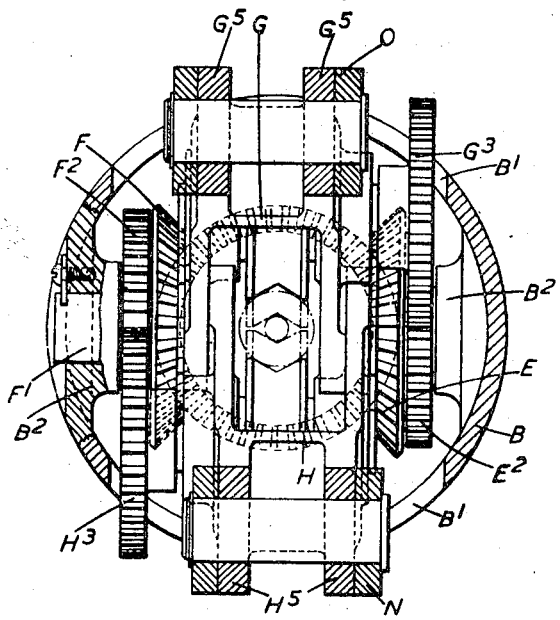
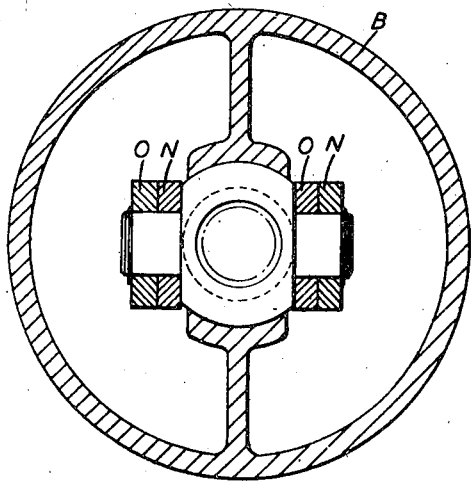

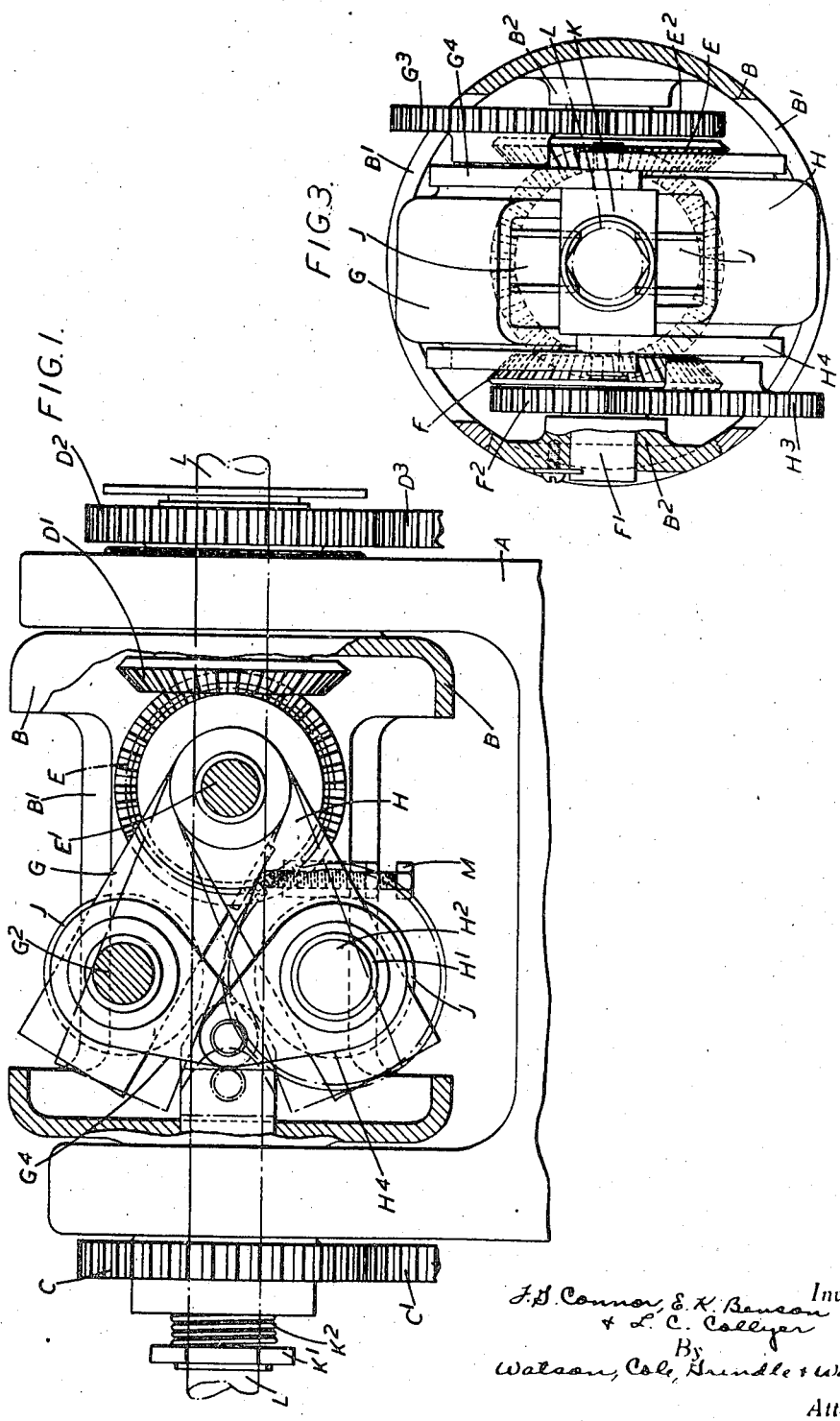

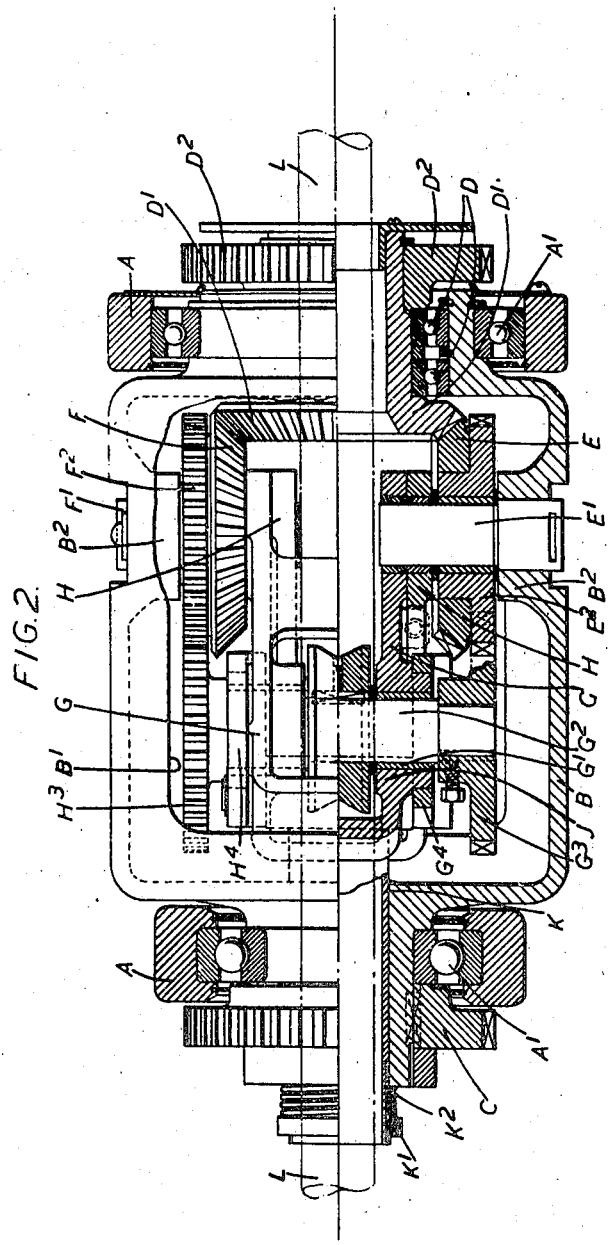

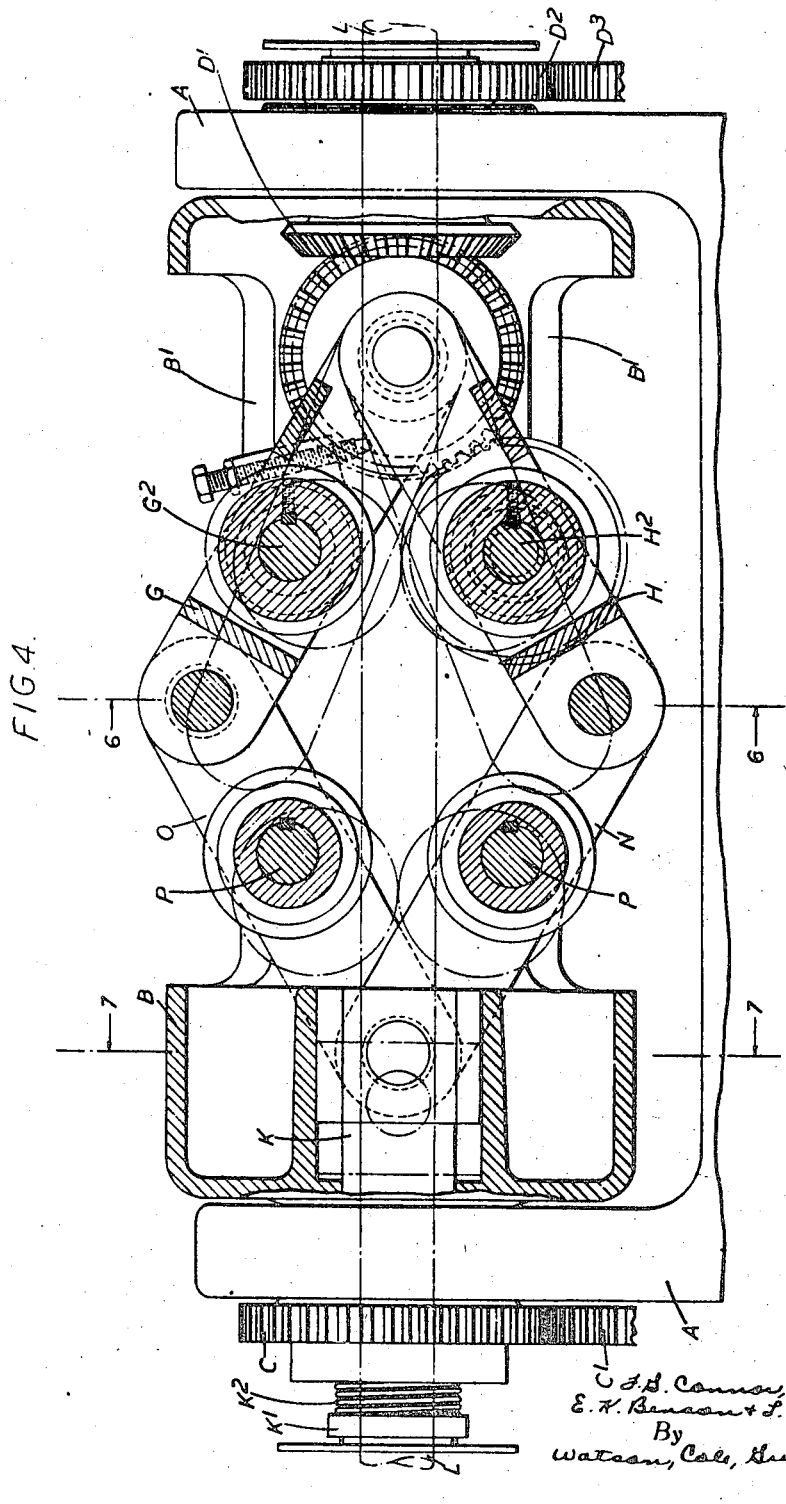

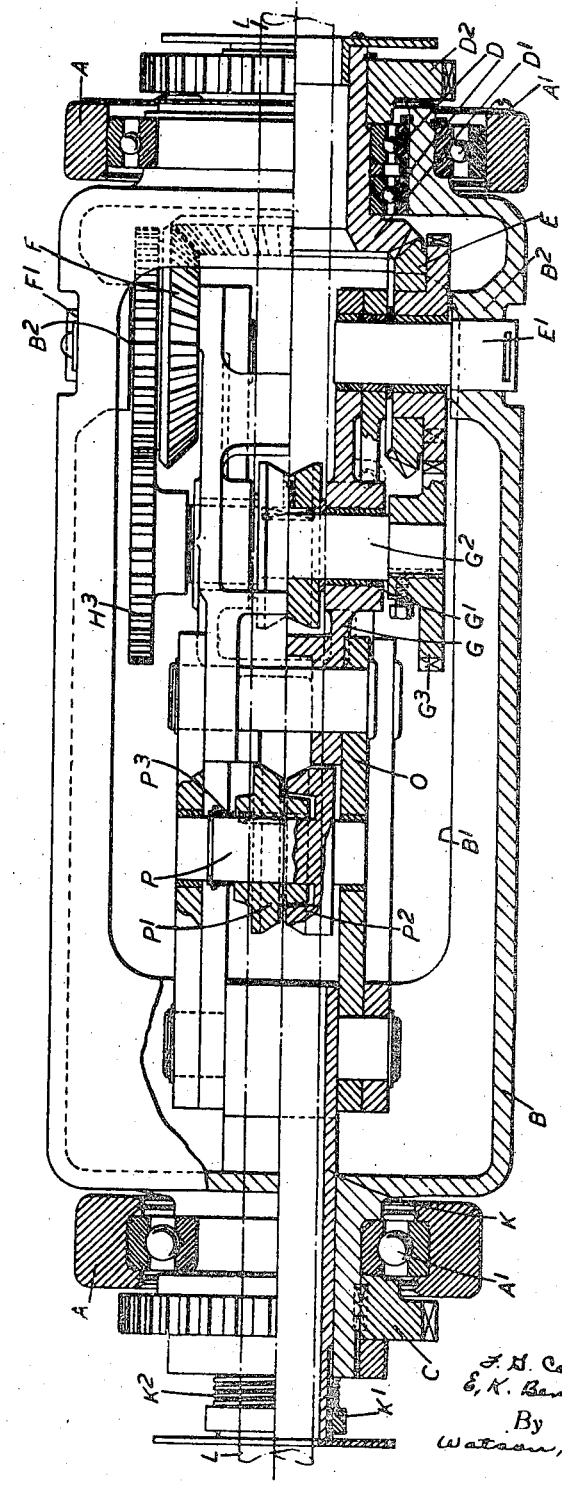

Patented Oct. 21, 1947

2,429,201

UNITED STATES PATENT OFFICE 2,429,201

WORK FEEDING AND ROTATING APPARATUS

Francis George Connor, Ernest Keen Benson, and Leonard Charles Collyer, London, England, assignors to The Ohio Crankshaft Company, Cleveland, Ohio, a corporation of Ohio Application May 18, 1945, Serial No. 594,520
In Great Britain July 10, 1944

4 Claims. (Cl. 214—1)

This invention relates to the continuous heat treatment of metal bars, and is particularly concerned with, although not limited to, induction heating by passing the bars through a high frequency coil, followed by quenching possibly followed by tempering or annealing.

An object of the invention is to minimise the effect of any eccentricity or irregularity of the heat treatment zone whether it be the coil, the quenching spray or cone, or the annealing or tempering means, on the homogeneity of the heat treated bar and to prevent distortion of the bar due to such eccentricity or irregularity or to stresses in the material.

According to the present invention apparatus for the continuous heat treatment of metal bars includes means for simultaneously rotating the bar about its axis and advancing it longitudinally relatively to the heat treatment zone. Means may be provided for varying the ratio between the angular and longitudinal velocities.

Conveniently the apparatus comprises rollers by which the bar is gripped and can be fed forward, mounted in a casing which can be bodily rotated about the axis of the bar which passes through it, the speed of rotation of the rollers about their own axes in the casing to feed the bar forward and that of the casing as a whole being dependently or independently adjustable. Thus, in a convenient arrangement, the casing embodies differential mechanism of the bevel type, the casing itself or members mounted to rotate bodily therewith constituting the spider carrying the radially arranged planet wheels which drive the rollers and mesh with a sun wheel which is coaxial with the axis of rotation of the casing, is formed annular so that the bar can pass through it and is arranged to be independently driven. If, therefore the casing and the sun wheel are driven at the same speed in the same direction the bar will be rotated but no rotation of the planet wheels about their own axes will be produced so that the bar will not be fed forward. Conversely if only the sun wheel is rotated and the casing is maintained stationary, the planet wheels will be rotated about their own axes to feed the bar forward but no rotation will be imparted to the bar. By rotating the casing and the sun wheel at different speeds both rotation and forward movement of the bar will be effected and the relationship between these two movements can be determined and varied by adjusting the relative speeds of rotation imparted to the casing and sun wheel.

In an alternative arrangement in which the planet wheels are similarly connected to the rollers, they may be carried in a freely rotatable cage and mesh with two annular sun wheels driven independently. In this case also by adjusting the relative speeds of the two sun wheels any desired relationship between the rate of feed and the rate of rotation of the bar can be obtained.

The invention may be carried into practice in various ways but two constructions according to the invention are illustrated by way of example in the accompanying drawings, in which Figure 1 is a side elevation partly in section of one construction, Figure 2 is a plan view, half in section, of the construction shown in Figure 1, Figure 3 is an end elevation of the construction shown in Figure 1 with parts broken away, Figure 4 is a similar view to Figure 1 of an alternative construction, Figure 5 is a plan view, partly in section, of the construction shown in Figure 4, Figure 6 is a section on the line 6—6 of Figure 4, and Figure 7 is a section on the line 7—7 of Figure 4.

In the construction illustrated in Figures 1 to 3 the apparatus comprises a fork-like frame A in which a casing B of generally tubular form is rotatably supported in bearings $A^1$, diametrically opposite parts of the casing being cut away as shown at $B^1$.

Rigidly connected to one end of the casing B is an annular gear wheel C arranged to be driven through gearing indicated at $C^1$ from some suitable source of power—for example an electric motor—preferably such that the speed at which the casing is driven through the gear wheel C can be controlled. Mounted in bearings D at the other end of the casing is an annular bevel wheel $D^1$ arranged to be driven through a gear wheel $D^2$ rigidly mounted thereon and a gear wheel $D^3$ meshing with the gear wheel $D^2$ from a source of power—for example a further electric motor— in a manner permitting its speed to be varied independently of that of the gear wheel C driving the casing B.

The bevel wheel $D^1$ meshes with two further bevel wheels E and F constituting planet wheels which are rotatably carried on radial stub shafts $E^1$, $F^1$ rigidly mounted in bosses $B^2$ on the casing B and rigidly coupled to spur gears $E^2$, $F^2$. Also supported on the shafts $E^1$, $F^1$ so as to be capable of rocking thereon are two U-shaped link-like frames G and H carrying in bearings $G^1$, $H^1$ cross shafts $G^2$, $H^2$. The shafts $G^2$, $H^2$ carry at points between the arms of the U-shaped frames, double conical rollers J and project from opposite sides of their frames to carry spur gears G³, H³ meshing respectively with the spur gears E², F².

Pivoted to the frames G, H coaxially with the shafts G², H² are the outer ends of links G⁴, H⁴ the inner ends of which are pivoted to a sleeve K extending through the bore of the adjacent end of the casing B and provided with a collar K¹ acted upon by a compression spring K² arranged between it and the end of the casing B.

The bar or rod L to be treated passes through the bores of the casing B and bevel wheel D¹ as shown and it will be seen that the spring K² acts through the sleeve K and links G⁴, H⁴ to draw the link-like frames G, H, and hence the rollers J inwards to maintain the rollers in close frictional contact with the bar. An adjustable stop M limits the movement of the frames towards one another when no bar is passing through the apparatus.

It will be seen also that if the gears C and D² are driven at the same speed and in the same direction the bar L will be rotated without being fed forward as there will be no rotation of the gearing carried by the casing B relatively to the casing and hence no rotation about their own axes of the rollers J. If, however, the gears C and D² are driven at different speeds, the bar L will be rotated and also fed forward by rotation of the rollers J about their own axes, the rate and direction of feed depending on the difference in speed between the two gears C and D² and on which is driven at the greater speed.

In the alternative construction illustrated in Figures 4 to 8 the arrangement is generally similar in construction and operation to that illustrated in Figures 1 to 3. The casings B is, however, considerably longer and, instead of the comparatively short links G⁴, H⁴, longer double links N, O are pivoted to extensions G⁵, H⁵ on the frames G and H and each double link carries, on a shaft P extending between its plates, a double cone roller comprising cones P¹, P² pressed towards one another by a spring P³ so as to grip the bar L.

Thus the rollers P¹, P² provide an additional frictional drive for ensuring rotation of the bar L with the casing B.

It is to be understood that the constructions illustrated in the drawings are given by way of example only and that the constructional form of the invention may vary widely within the scope of the appended claims without departing from this invention.

What we claim as our invention and desire to secure by Letters Patent is:

1. Apparatus for rotating and advancing an elongated work-piece, comprising a casing, differential mechanism of the bevel type mounted in the casing and including a sun wheel and radially arranged planet wheels meshing therewith, rollers for engaging the work-piece driven from said planet wheels, said rollers being carried by members pivoted about the axes of said planet wheels, means for urging the outer ends of said members toward said work-piece to cause said rollers to grip the work-piece, and means for driving the sun wheel and the casing about the axis of said work-piece at different speeds.

2. Apparatus according to claim 1, said roller-carrying members having links pivoted to their outer ends, the other ends of said links being connected to an axially movable sleeve, and means for urging said sleeve in the direction to cause said rollers to grip the work-piece.

3. Apparatus according to claim 1, said roller-carrying members having links pivoted to their outer ends, the other ends of said links being connected to an axially movable sleeve, means for urging said sleeve in the direction to cause said rollers to grip the work-piece, and additional rollers carried by said links for engaging the work-piece.

4. Apparatus according to claim 1, said roller-carrying members having links pivoted to their outer ends, the other ends of said links being connected to an axially movable sleeve, means for urging said sleeve in the direction to cause said rollers to grip the work-piece, and additional rollers carried by said links for engaging the work-piece, each said additional roller comprising two oppositely coned parts and spring means urging said parts toward one another.

FRANCIS GEORGE CONNOR.
ERNEST KEEN BENSON.
LEONARD CHARLES COLLYER.

REFERENCES CITED

The following references are of record in the file of this patent:

UNITED STATES PATENTS

| Number | Name | Date |
|---|---|---|
| 1,030,283 | Coda | June 25, 1912 |
| 1,301,679 | Gammeter | Apr. 22, 1919 |
| 1,467,236 | DeLavand | Sept. 4, 1923 |
| 1,686,929 | Rosener | Oct. 9, 1928 |
| 2,048,557 | Mickelson | July 21, 1936 |
| 2,202,759 | Denneen et al. | May 28, 1940 |
| 2,329,188 | Denneen et al. | Sept. 14, 1943 |
| 2,347,639 | Platt | Apr. 25, 1944 |
| 2,355,184 | Somes | Aug. 8, 1944 |
| 2,359,273 | Somes | Sept. 26, 1944 |